July 5, 1949.  H. R. HOUCHINS  2,475,565

CERAMIC BONDED ABRASIVE ARTICLES

Filed Sept. 21, 1946

INVENTOR.
Henry R. Houchins
BY
ATTORNEY.

Patented July 5, 1949

2,475,565

UNITED STATES PATENT OFFICE 2,475,565

CERAMIC BONDED ABRASIVE ARTICLES

Henry R. Houchins, Niagara Falls, N. Y., assignor to The Carborundum Company, Niagara Falls, N. Y., a corporation of Delaware Application September 21, 1946, Serial No. 698,430

13 Claims. (Cl. 51—308)

This application relates to abrasive articles and particularly to such articles in which a vitrified ceramic bond for diamond abrasive is employed.

It is an object of the present invention to provide abrasive articles in which abrasive particles or grains are bonded into strong, useful structures. It is a further object of the invention to provide vitrified ceramic-bonded abrasive articles, particularly diamond abrasive articles, which have a dense, exceptionally hard structure.

Although diamond as an abrasive has come into wide use because of its unique hardness, its high cost has prevented its use in many desirable operations. It is consequently of great importance that diamond abrasive articles be formed in such manner that no undue loss of diamond occurs through excessive and unwanted breakdown of the bonding material. In general the longer a diamond abrasive particle is held by the bond the less expensive are abrading operations with diamond abrasive.

It has been discovered that ceramic compositions resulting from the firing at high temperatures of mixes containing a major percentage of talc produce excellent bonds for diamond abrasive. Such vitrified bonds are very hard, strong, and tough and therefore firmly hold the diamond particles. The use of such bonds is also advantageous since their shrinkage is low and it is therefore easier to control the size of articles produced by molding and to eliminate warpage. Although such bonds are of especial value with diamond abrasive they may also, of course, be used with other abrasives such as silicon carbide, fused alumina, emery, corundum, boron carbide, etc. and with mixtures of diamond and one or more of the foregoing abrasives.

Figure 1:
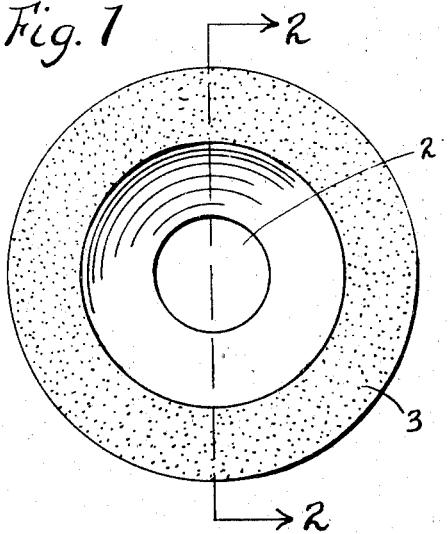
Figure 2:
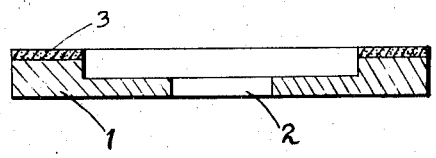
Figure 3:
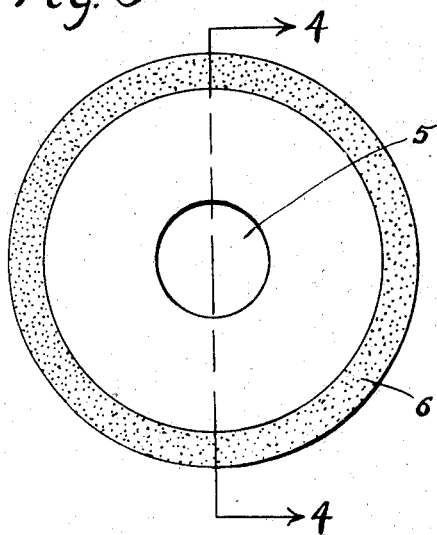
Figure 4:
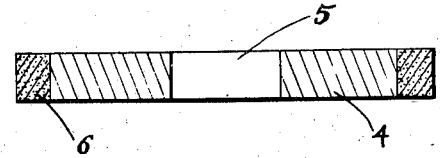

In the accompanying drawing, Figure 1 is a plan view of a cup-type abrasive wheel made in accordance with the present invention. Figure 2 is a sectional view on line 2—2 of Figure 1. Figure 3 is a plan view of a peripheral grinding wheel according to the present invention, and Figure 4 is a sectional view on line 4—4 of Figure 3.

The drawings described above are conventionalized showings. In the abrasive wheel illustrated in Figures 1 and 2, the body or backing portion 1 has an arbor hole 2 provided therein and supports an abrasive portion 3 which may be secured to the backing by any suitable means or may, as hereinafter described, be molded integrally therewith. In Figures 3 and 4 the peripheral grinding wheel shown comprises a body portion or core 4 having an arbor hole 5. Core 4 is surrounded on its periphery by an abrasive portion 6 which is secured thereto by any suitable means. If desired, as pointed out hereinafter, the abrasive ring 6 may be molded integrally with core 4.

In the following examples there are set forth bond compositions which are suitable for forming abrasive articles with diamond abrasive.

EXAMPLE I

| | Per cent |
|---|---|
| Feldspar | 5.7 |
| Ball clay | 11.4 |
| Talc | 77.9 |
| Silicon carbide (finely divided) | 5.0 |

EXAMPLE II

| | Per cent |
|---|---|
| Feldspar | 15.2 |
| Ball clay | 20.9 |
| Talc | 58.9 |
| Silicon carbide (finely divided) | 5.0 |

EXAMPLE III

| | Per cent |
|---|---|
| Feldspar | 4.7 |
| Ball clay | 9.4 |
| Talc | 64.1 |
| Silicon carbide (finely divided) | 21.8 |

It will be seen from the above examples that the proportions of ingredients may be varied within a substantial range. When mixes of the type of Examples I, II, and III are employed, the percentage of ingredients may vary as shown in the table below.

Table

| | Approximate per cent |
|---|---|
| Feldspar | 0–16 |
| Ball clay | 0–30 |
| Talc | 50–100 |
| Silicon carbide | 0–25 |

Although, as pointed out in the table, the range within which the composition of the bond mixes may be varied is wide, it has been found that for practical use the feldspar content should be from approximately 3 to 15%, the ball clay content from approximately 5 to 20%, the talc content from approximately 55 to 80%, and the silicon carbide content from approximately 5 to 22%.

In preparing abrasive articles with the improved bonds of the present application, the raw materials of the bond are mixed together in finely divided form as by ball milling. The blended bond is then incorporated in an abrasive mix with the desired proportion of diamond and/or other abrasive and a small amount of water to give a moldable batch. The dampened abrasive mix is then pressed into the desired shape and matured by firing in a kiln. The following example shows an abrasive mix which is very satisfactory for use in forming diamond honing sticks.

EXAMPLE IV

| | Parts by weight |
|---|---|
| Diamond abrasive | 28 |
| Bond (of Example II) | 72 |
| Water | 7 |

Other examples of abrasive mixes which are more suitable for forming abrasive wheels are the following:

EXAMPLE V

| | Parts by weight |
|---|---|
| Diamond abrasive | 29 |
| Bond (of Example I) | 71 |
| Water | 5 |

EXAMPLE VI

| | Parts by weight |
|---|---|
| Diamond abrasive | 14.9 |
| Bond (of Example I) | 85.1 |
| Water | 5.0 |

EXAMPLE VII

| | Parts by weight |
|---|---|
| Diamond abrasive | 15.0 |
| Bond (of Example III) | 85.0 |
| Water | 4.5 |

While the examples given above have utilized bonds in which, besides the talc, there is present a binder, ball clay, and a flux, feldspar, it is to be noted that other binders may be used such, for example, as bentonite or even organic binders such as stearic acid or gum tragacanth. Also, instead of feldspar as a flux, it is possible to employ an alkaline earth compound such as barium carbonate. Although either the flux or binder or both may be wholly omitted, the proper maturing temperature may then be unduly high and the structure obtained at lower temperatures may not be desirable for most purposes.

The silicon carbide disclosed in Examples I, II, and III is very finely divided, preferably 320 grit or finer, and serves to produce an insignificant abrasive action. Its function is more that of a non-reactive filler which prevents blistering during firing of the bond and produces a more uniform structure. Instead of silicon carbide there may be used other fillers of the nature of zircon, fused quartz, fused alumina, and the like which are non-reactive at the maturing temperatures employed. About 5% of non-reactive filler is sufficient to produce the results just mentioned. It is possible and often desirable however, to employ considerably more non-reactive filler and thus to vary the structure of the article and to produce diamond abrasive articles which cover a range of gradings.

It is highly desirable in forming the bond mix from its ingredients that the ingredients be of small particle size and that the mixture be as nearly homogeneous as possible. While dry ball milling of the ingredients will in some acses suffice, it is preferred that the ingredients be mixed and the size of the particles be reduced by prolonged ball milling with water. After the wet milling, the bond mixture may be dried and again reduced to a fine state of subdivision before admixture with the abrasive grain and water used in molding.

In molding abrasive articles from abrasive mixes of the type herein described, it is desirable to use high molding pressures. It has been found that pressures within the range from about 8,000 p. s. i. to 20,000 p. s. i. are sufficient for practical purposes. Since, however, higher pressures tend to further increase the hardness of and reduce shrinkage in the articles formed, pressures up to 50,000 p. s. i. or higher may be employed where their use is convenient or economical.

As diamond is not resistant to oxidation at high temperatures, it is desirable in maturing the bonds of abrasive articles produced in accordance with the present invention to use a reducing atmosphere. A convenient way to protect such diamond abrasive articles from oxidation during firing is to place the articles in a crucible, sagger or container of carbon which is provided with a carbon lid. The atmosphere existing in such a container at the high temperatures used will be found sufficiently reducing or at least non-oxidizing as to prevent oxidation of the diamond particles. Diamond has been found to have an increased tendency to graphitize when heated to temperatures of above about 1300° C. even under non-oxidizing conditions. Accordingly, it is desirable that the firing temperatures employed do not substantially exceed about 1300° C. Articles such as those described in Examples IV to VII may be fired quite satisfactorily at that temperature. It will be understood that, since, in general, the higher the proportion of flux or inorganic binder present the lower the temperature required for firing to a desired degee of hardness, the temperatures used are capable of some variation depending upon the composition of the bond and the use to which the article is to be put. For example, vitrified abrasive hones are usually considerably harder than vitrified abrasive wheels and thus if the same abrasive mix were used in making both a wheel and a hone the former would be fired at a somewhat lower temperature.

As is well known, many diamond abrasive articles are desired in which it is unnecessary for the entire body to be abrasive. It is common practice, for example, for abrasive hones to be formed by either cementing an abrasive stick to a support or in some cases by molding together a backing portion with an abrasive section and maturing the two together. Likewise it is well known that many abrasive wheels contain core or supporting members. Some of these are formed as with hones by cementing abrasive sections to supports. More frequently the support or core and the abrasive portion of the wheel are molded and matured together. Although the supports or cores herein referred to may contain fillers which are more or less abrasive in character, it is not intended that they perform any abrasive function and they are regarded as non-abrasive portions of an abrasive article.

Of course it is intended that the abrasive mixes of the present invention may be used in making composite abrasive articles of the types above described. When the support or core and the abrasive portion of such an article are to be molded together, the support or core may be formed from the same bond mixture as the abrasive portion with the addition of a suitable amount of filler to give substantially the same shrinkage and coefficient of expansion in the support or core as in the abrasive portion. Any non-reactive filler may be employed. As an example, in many cases to satisfactorily adjust the bond for use as the support or core of a composite abrasive article it is only necessary to increase the silicon carbide content thereof.

As pointed out above, abrasive articles made in accordance with the present invention have vitrified bonds which are very hard and tough and hold the abrasive grains firmly. The bonds are not subject to the very large degree of shrinkage characteristic of many ceramic bonds and thus the molding of articles to size is made easier. The toughness of the bonds of the present invention is believed to result from the fact that they are principally crystalline in nature after firing and usually contain only from about 5 to 30% of a glassy phase depending upon the amount of flux and binder present.

Where percentages are referred to in the foregoing specification and the accompanying claims, percentages by weight are meant.

It will be understood by those skilled in the art that there are many changes and variations which may be made in the foregoing practice without departing from the spirit of the invention. The description is therefore not to be interpreted as limiting the invention except as limitations are contained in the following claims.

I claim:

1. An abrasive article consisting of an abrasive portion and a core or supporting portion; said abrasive portion consisting of diamond abrasive particles bonded by the vitrified reaction product of from 55 to 80% talc, 3 to 15% feldspar, 5 to 20% ball clay and 5 to 22% silicon carbide; said vitrified reaction product containing from about 5 to 30% of a glassy phase.

2. An abrasive article consisting of an abrasive portion and a core or supporting portion; said abrasive portion consisting of abrasive particles including diamond bonded by the vitrified reaction product of from 55 to 80% talc, 3 to 15% feldspar, 5 to 20% ball clay and 5 to 22% silicon carbide; said vitrified reaction product containing from about 5 to 30% of a glassy phase.

3. An abrasive article consisting of an abrasive portion and a core or supporting portion; said abrasive portion consisting of abrasive particles including diamond bonded by the vitrified reaction product of from 50 to 100% talc, 0 to 16% feldspar, 0 to 30% ball clay and 0 to 25% inert filler; said vitrified reaction product containing from about 5 to 30% of a glassy phase.

4. An abrasive article having an abrasive portion which consists of diamond abrasive particles bonded by the vitrified reaction product of from 55 to 80% talc, 3 to 15% feldspar, 5 to 20% ball clay and 5 to 22% silicon carbide; said vitrified reaction product containing from about 5 to 30% of a glassy phase.

5. An abrasive article having an abrasive portion which consists of abrasive particles including diamond bonded by the vitrified reaction product of from 55 to 80% talc, 3 to 15% feldspar, 5 to 20% ball clay and 5 to 22% silicon carbide; said vitrified reaction product containing from about 5 to 30% of a glassy phase.

6. An abrasive article having an abrasive portion which consists of abrasive particles including diamond bonded by the vitrified reaction product of from 50 to 100% talc, 0 to 16% feldspar, 0 to 30% ball clay and 0 to 25% inert filler; said vitrified reaction product containing from about 5 to 30% of a glassy phase.

7. A raw mix for a bond for diamond abrasive articles which consists of from 55 to 80% talc, 3 to 15% feldspar, 5 to 20% ball clay and 5 to 22% silicon carbide.

8. An abrasive article consisting of an abrasive portion and a core or supporting portion; said abrasive portion consisting of abrasive particles including diamond bonded by the vitrified reaction product of from 55 to 88% talc, 0 to 15% feldspar, 0 to 20% ball clay, and 5 to 22% silicon carbide; said vitrified reaction product containing from about 5 to 30% of a glassy phase.

9. An abrasive article having an abrasive portion which consists of abrasive particles including diamond bonded by the vitrified reaction product of from 55 to 80% talc, 3 to 15% flux, 5 to 20% binder and 5 to 22% of a granular inert filler; said vitrified reaction product containing from about 5 to 30% of a glassy phase.

10. An abrasive article having an abrasive portion which consists of abrasive particles including diamond bonded by the vitrified reaction product of from 55 to 88% talc, 0 to 15% feldspar, 0 to 20% ball clay and 5 to 22% silicon carbide; said vitrified reaction product containing from about 5 to 30% of a glassy phase.

11. An abrasive article having an abrasive portion which consists of abrasive particles including diamond bonded by the vitrified reaction product of about 77.9% talc, 5.7% feldspar, 11.4% ball clay and 5.0% silicon carbide; said vitrified reaction product containing from about 5 to 30% of a glassy phase.

12. An abrasive article having an abrasive portion which consists of abrasive particles including diamond bonded by the vitrified reaction product of about 58.9% talc, 15.2% feldspar, 20.9% ball clay and 5.0% silicon carbide; said vitrified reaction product containing from about 5 to 30% of a glassy phase.

13. An abrasive article having an abrasive portion which consists of abrasive particles including diamond bonded by the vitrified reaction product of about 64.1% talc, 4.7% feldspar, 9.4% ball clay and 21.8% silicon carbide; said vitrified reaction product containing from about 5 to 30% of a glassy phase.

HENRY R. HOUCHINS.

REFERENCES CITED

The following references are of record in the file of this patent:

UNITED STATES PATENTS

| Number | Name | Date |
| --- | --- | --- |
| 149,708 | Bausmith | Apr. 14, 1874 |
| 2,102,343 | Whitcomb et al. | Dec. 14, 1937 |
| 2,104,841 | White | Jan. 11, 1938 |
| 2,115,666 | Dorn | Apr. 26, 1938 |
| 2,137,200 | Boyer | Nov. 15, 1938 |
| 2,259,468 | Houchins | Oct. 21, 1941 |

FOREIGN PATENTS

| Number | Country | Date |
| --- | --- | --- |
| 367,114 | Great Britain | Feb. 18, 1932 |